United States Patent
Fujita

(10) Patent No.: US 8,937,729 B2
(45) Date of Patent: Jan. 20, 2015

(54) IMAGE READING APPARATUS, IMAGE FORMING APPARATUS, AND IMAGE READING METHOD

(71) Applicant: KYOCERA Document Solutions Inc., Osaka-shi (JP)

(72) Inventor: Hiroyuki Fujita, Osaka-shi (JP)

(73) Assignee: KYOCERA Document Solutions, Osaka-shi (JP)

( * ) Notice: Subject to any disclaimer, the term of this patent is extended or adjusted under 35 U.S.C. 154(b) by 0 days.

(21) Appl. No.: 14/184,067

(22) Filed: Feb. 19, 2014

(65) Prior Publication Data

US 2014/0240804 A1  Aug. 28, 2014

(30) Foreign Application Priority Data

Feb. 26, 2013  (JP) .................................. 2013-035688

(51) Int. Cl.
| | |
|---|---|
| G06F 3/12 | (2006.01) |
| G03G 15/00 | (2006.01) |
| G06K 15/00 | (2006.01) |
| H04N 1/387 | (2006.01) |
| H04N 1/60 | (2006.01) |
| H04N 1/48 | (2006.01) |

(52) U.S. Cl.
CPC .............. *H04N 1/6072* (2013.01); *H04N 1/48* (2013.01)
USPC ........... 358/1.13; 358/1.18; 358/453; 399/86; 399/361

(58) Field of Classification Search
None
See application file for complete search history.

(56) References Cited

U.S. PATENT DOCUMENTS

| | | | | | |
|---|---|---|---|---|---|
| 4,256,400 | A | * | 3/1981 | Komori et al. ................. | 399/183 |
| 4,743,944 | A | * | 5/1988 | Tomosada et al. .............. | 399/86 |
| 5,479,262 | A | * | 12/1995 | Namiki et al. ................. | 358/296 |
| 2006/0208157 | A1 | * | 9/2006 | Michiie ...................... | 250/208.1 |
| 2009/0290169 | A1 | * | 11/2009 | Kobashi ......................... | 358/1.2 |

FOREIGN PATENT DOCUMENTS

JP           11109727 A      4/1999

* cited by examiner

*Primary Examiner* — Marivelisse Santiago Cordero
*Assistant Examiner* — Moustapha Diaby
(74) *Attorney, Agent, or Firm* — Alleman Hall McCoy Russell & Tuttle LLP

(57) ABSTRACT

An image reading apparatus includes a document table, an image reading portion, a cover member, a reading control portion, and a document determination portion. On a color reference surface of the cover member which opposes to a document table, a partial region is provided which has a predetermined density different from a density of the color reference surface. The reading control portion reads image data from the color reference surface and the partial region of the cover member by the image reading portion. When a density difference between a density of the color reference surface and a density of the partial region on the image data read by the reading control portion is equal to or smaller than a predetermined threshold value, the document determination portion determines that the document placed on the document placement surface is a book document.

18 Claims, 6 Drawing Sheets

IMAGE READING APPARATUS, IMAGE FORMING APPARATUS, AND IMAGE READING METHOD

INCORPORATION BY REFERENCE

This application is based upon and claims the benefit of priority from the corresponding Japanese Patent Application No. 2013-035688 filed on Feb. 26, 2013, the entire contents of which are incorporated herein by reference.

BACKGROUND

The present disclosure relates to an image reading apparatus which reads image data from a document placed on a document table, and to an image forming apparatus.

Generally, an image reading apparatus is known which radiates light from below to a document placed on a document table and receives the corresponding reflected light by a photoelectric conversion element such as a CCD, thereby reading image data from the document. In the case where, by using an image reading apparatus of this type, image data is read from a thick document (hereinafter, referred to as a "book document") such as a book formed by a plurality of sheets bound at the center, a gap occurs between the document table and a center portion of the book document. Therefore, the amount of light reflected from the center portion of the book document decreases, so that a black belt-like image appears at the center portion of the book document on image data read by the image reading apparatus. Considering this, an image forming apparatus is known which has a special sensor for determining whether or not a document placed on a document table is a book document, and when it is determined that the document is a book document, changes the black belt-like image to a white belt part to perform printing.

SUMMARY

An image reading apparatus according to one aspect of the present disclosure includes a document table, an image reading portion, a cover member, a reading control portion, and a document determination portion. The document table has a document placement surface which allows a document to be placed thereon. Based on light reflected when light is radiated through the document placement surface to a document placed on the document placement surface, the image reading portion reads image data from the document. The cover member is openable and closable with respect to the document table. On a color reference surface of the cover member which opposes to the document table, a partial region is provided which has a predetermined density different from a density of the color reference surface. The reading control portion reads image data from the color reference surface and the partial region of the cover member by the image reading portion. When a density difference between a density of the color reference surface and a density of the partial region on the image data read by the reading control portion is equal to or smaller than a predetermined threshold value, the document determination portion determines that the document placed on the document placement surface is a book document.

An image forming apparatus according to another aspect of the present disclosure includes an image reading apparatus which reads an image, and an image forming portion which forms an image. The image reading apparatus includes a document table, an image reading portion, a cover member, a reading control portion, and a document determination portion. The document table has a document placement surface which allows a document to be placed thereon. Based on light reflected when light is radiated through the document placement surface to a document placed on the document placement surface, the image reading portion reads image data from the document. The cover member is openable and closable with respect to the document table. On a color reference surface of the cover member which opposes to the document table, a partial region is provided which has a predetermined density different from a density of the color reference surface. The reading control portion reads image data from the color reference surface and the partial region of the cover member by the image reading portion. When a density difference between a density of the color reference surface and a density of the partial region on the image data read by the reading control portion is equal to or smaller than a predetermined threshold value, the document determination portion determines that the document placed on the document placement surface is a book document.

An image reading method according to another aspect of the present disclosure is an image reading method which executes a reading control step and a document determination step in an image reading apparatus including a document table, an image reading portion, and a cover member. The document table has a document placement surface which allows a document to be placed thereon. Based on light reflected when light is radiated through the document placement surface to a document placed on the document placement surface, the image reading portion reads image data from the document. The cover member is openable and closable with respect to the document table. On a color reference surface of the cover member which opposes to the document table, a partial region is provided which has a predetermined density different from a density of the color reference surface. The reading control step reads image data from the color reference surface and the partial region of the cover member by the image reading portion. When a density difference between a density of the color reference surface and a density of the partial region on the image data read in the reading control step is equal to or smaller than a predetermined threshold value, the document determination step determines that the document placed on the document placement surface is a book document.

This Summary is provided to introduce a selection of concepts in a simplified form that are further described below in the Detailed Description with reference where appropriate to the accompanying drawings. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

<Schematic Configuration of Multifunction Peripheral 10>

Figure 1A:
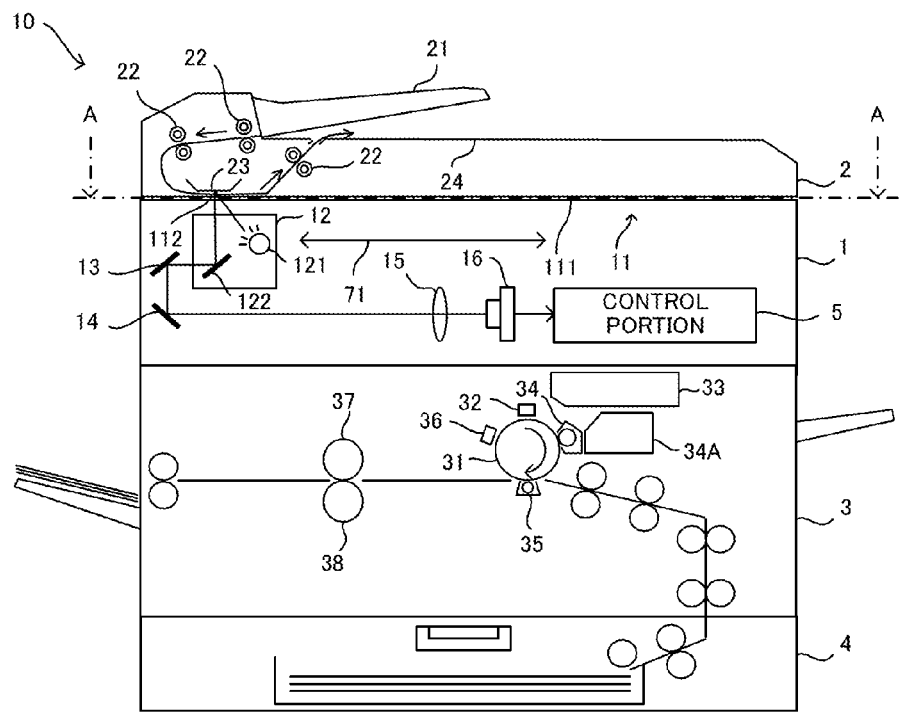
FIGS. 1A and 1B are configuration diagrams of a multifunction peripheral according to an embodiment of the present disclosure.
Figure 1B:
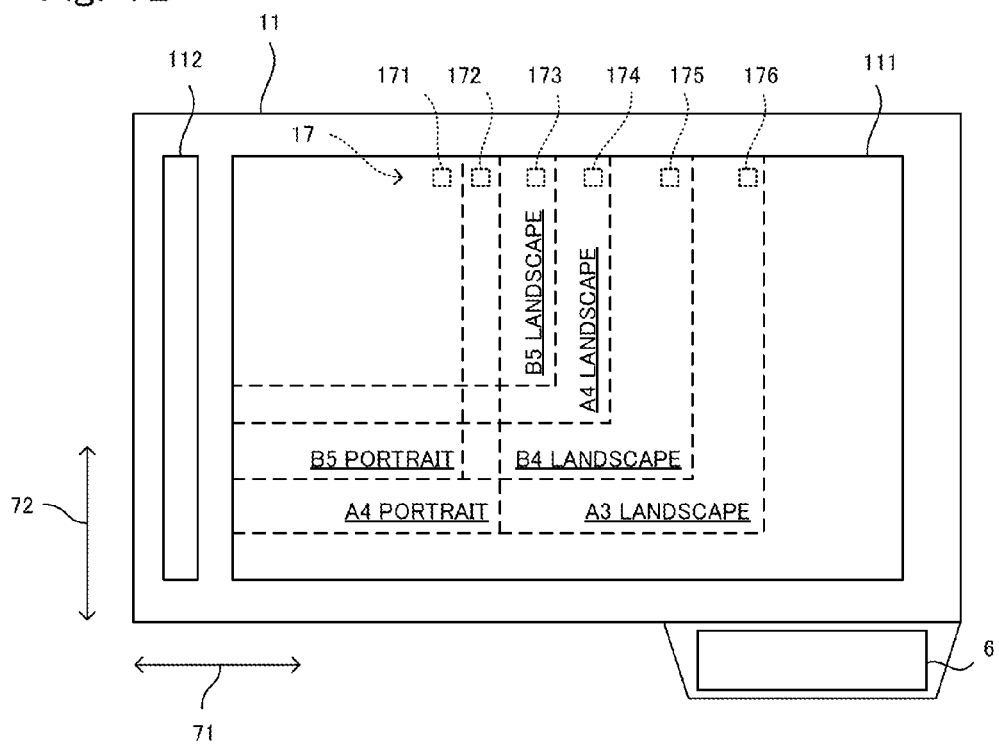

First, with reference to FIGS. 1A and 1B, the schematic configuration of a multifunction peripheral 10 according to an embodiment of the present disclosure will be described. It is noted that FIG. 1A is a schematic sectional view of the multifunction peripheral 10 and FIG. 1B is a view as seen from an A-A arrow direction in FIG. 1A.

The multifunction peripheral 10 is an image forming apparatus including an image reading portion 1, an ADF 2, an image forming portion 3, a sheet feed cassette 4, a control portion 5, an operation display portion 6, and the like. The operation display portion 6 is a touch panel or the like for displaying various types of information in accordance with a control instruction from the control portion 5 and for inputting various types of information to the control portion 5. It is noted that in the multifunction peripheral 10, the image reading portion 1, the ADF 2, and the control portion 5 compose an image reading apparatus according to the present disclosure. In addition, the present disclosure is applicable to an image reading apparatus or an image forming apparatus such as a scanner, a facsimile apparatus, and a copy machine.

The control portion 5 is a computer having control devices such as a CPU, a ROM, a RAM, and an EEPROM. The control portion 5 executes, by the CPU, various control programs stored in advance in the ROM, thereby performing overall control for the multifunction peripheral 10. The RAM is a volatile storage portion and the EEPROM is a nonvolatile storage portion, and they are used as a temporary storage memory for various processes executed by the CPU or an image memory. It is noted that the control portion 5 may be formed by an electronic circuit such as an integrated circuit (ASIC, DSP), or may be a control portion provided separately from a main control portion that performs overall control for the multifunction peripheral 10.

In addition, an image reading program for causing the CPU of the control portion 5 to execute image reading processing (see a flowchart in FIG. 4) described later is stored in advance in the ROM of the control portion 5. It is noted that the image reading program may be stored in a computer-readable storage medium such as a CD, a DVD, and a flash memory, and may be installed from the storage medium into a storage portion such as the EEPROM of the control portion 5 or a hard disk (not shown).

The image reading portion 1 is an image reading portion including a document table 11, a reading unit 12, mirrors 13 and 14, an optical lens 15, a CCD (Charge Coupled Device) 16, a size detection portion 17, and the like.

The document table 11 is provided on the upper surface of the image reading portion 1, and has a document placement surface 111 and a conveyance reading surface 112. The document placement surface 111 is a transparent contact glass on which a document is placed as an image data reading target. The conveyance reading surface 112 is a conveyance reading glass which allows transmission of light radiated from the reading unit 12 to a document conveyed by the ADF 2.

The reading unit 12 includes an LED light source 121 and a mirror 122, and can be moved in a secondary scanning direction 71 by a movement mechanism (not shown) using a drive portion such as a stepping motor. When the reading unit 12 is moved in the secondary scanning direction 71 by the drive portion, light radiated from the LED light source 121 to above the document table 11 is caused to scan in the secondary scanning direction 71.

The LED light source 121 includes multiple white LEDs arranged along a primary scanning direction 72. The LED light source 121 radiates, to a document, white light for one line along the primary scanning direction 72, through the document placement surface 111 or the conveyance reading surface 112 of the document table 11. A position to which light is radiated by the LED light source 121 is a reading position for image data by the image reading portion 1. The reading position moves in the secondary scanning direction 71 along with movement of the reading unit 12 in the secondary scanning direction 71. Specifically, when reading image data from a document placed on the document placement surface 111, the reading unit 12 is moved to such a position that light from the LED light source 121 will pass through the document placement surface 111. In addition, when reading image data from a document conveyed by the ADF 2, the reading unit 12 is moved to such a position that light from the LED light source 121 will pass through the conveyance reading surface 112.

The mirror 122 reflects, toward the mirror 13, light reflected when the LED light source 121 radiates light to a document present at the reading position. Then, the light reflected by the mirror 122 is guided into the optical lens 15 by the mirror 13 and the mirror 14. The optical lens 15 converges incident light and causes the converged light to enter the CCD 16.

The CCD 16 is a photoelectric conversion element which converts received light to an electric signal (voltage) corresponding to the light amount and outputs the electric signal as image data. The CCD 16 inputs, to the control portion 5, as image data of the document, an electric signal based on the reflected light that has been reflected from the document and has entered the CCD 16 when the light has been radiated from the LED light source 121. Thus, in the image reading portion 1, based on light reflected when light has been radiated through the document placement surface 111 to a document placed on the document placement surface 111, or based on light reflected when light has been radiated through the conveyance reading surface 112 to a document conveyed by the ADF 2, image data is read from the document.

The size detection portion 17 includes a plurality of optical sensors 171 to 176 provided below the document placement surface 111, as shown in FIG. 1B. The optical sensors 171 to 176 are reflection-type optical sensors provided for detecting the length (hereinafter, referred to as a "sheet length") in the secondary scanning direction 71 of a document placed on the document placement surface 111.

Specifically, the optical sensors 171 to 176 are located at positions along the secondary scanning direction 71, corresponding to sizes of B5 portrait, A4 portrait, B5 landscape, A4 landscape, B4 landscape, and A3 landscape. The optical sensors 171 to 176 detect whether or not a document is present at their respective positions. A result of detection by the size detection portion 17 is inputted to the control portion 5. Thus, the control portion 5 can detect the sheet length of a document placed on the document placement surface 111, based on the result of detection by the size detection portion 17. It is noted that the control portion 5 may determine the sheet length of the document, based on image data of the document read by the image reading portion 1.

Further, the control portion 5 has a function of detecting the width (hereinafter, referred to as a "sheet width") in the primary scanning direction 72 of a document placed on the document placement surface 111. For example, the control portion 5 detects the width in the primary scanning direction 72 of the document placed on the document placement surface 111, based on light entering the CCD 16 when the LED light source 121 is lit up at a reading start position on the document placement surface 111. It is noted that optical sensors may be provided at respective positions along the primary scanning direction 72 that correspond to sheet widths of a plurality of document sizes, and the control portion 5 may determine the sheet width of the document in accordance with a result of detection by each optical sensor.

The image forming portion 3 is an electrophotographic type image forming portion that executes image forming processing (print processing) based on image data read by the image reading portion 1 or image data inputted from an information processing apparatus such as an external personal computer.

Specifically, the image forming portion 3 includes a photosensitive drum 31, a charging device 32, an exposure device (Laser Scanning Unit) 33, a developing device 34, a transfer roller 35, an electricity removing device 36, a fixing roller 37, a pressure roller 38, and the like. In the image forming portion 3, an image is formed on a paper sheet fed from the sheet feed cassette 4 through the following procedure.

First, the photosensitive drum 31 is uniformly charged at a predetermined potential by the charging device 32. Next, light based on image data is radiated to the surface of the photosensitive drum 31 by the exposure device 33. Thus, an electrostatic latent image corresponding to the image data is formed on the surface of the photosensitive drum 31. Then, the electrostatic latent image on the photosensitive drum 31 is developed (visualized) as a toner image by the developing device 34. It is noted that a toner (developer) is supplied to the developing device 34 from a toner container 34A detachably connected to the image forming portion 3. Subsequently, the toner image formed on the photosensitive drum 31 is transferred onto a paper sheet by the transfer roller 35. Thereafter, the toner image transferred onto the paper sheet is melted and fixed by being heated by the fixing roller 37 when the paper sheet passes between the fixing roller 37 and the pressure roller 38. It is noted that the potential of the photosensitive drum 31 is removed by the electricity removing device 36.

Figure 2:
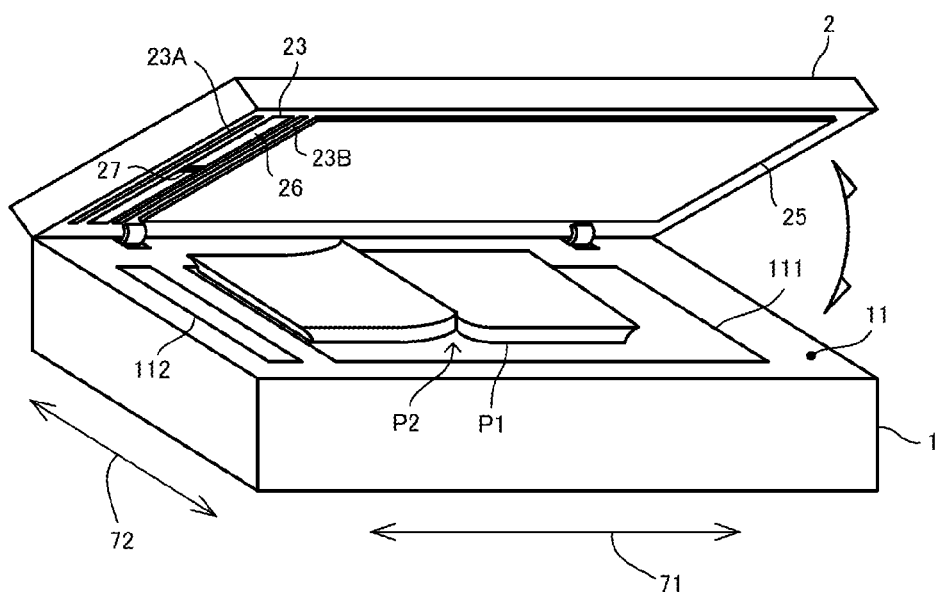
FIG. 2 is a schematic diagram showing a major part of the multifunction peripheral according to the embodiment of the present disclosure.

Next, with reference to FIGS. 1A and 2, the ADF 2 will be described. FIG. 2 is a major part schematic diagram showing the ADF 2 in a simplified fashion.

As shown in FIG. 1A, the ADF 2 is a document conveying portion including a document set portion 21, a plurality of conveying rollers 22, a document holder 23, a sheet discharge portion 24, and the like. The document holder 23 is provided above the conveyance reading surface 112, with a space being provided therebetween so as to allow a document to pass therebetween.

By each conveying roller 22 being driven by a motor (not shown), the ADF 2 causes a document on the document set portion 21 to pass through the reading position for image data by the image reading portion 1 and then to be conveyed to the sheet discharge portion 24. More specifically, in the ADF 2, as shown in FIG. 2, a document on the document set portion 21 passes by an opening 23A adjacent to the document holder 23 and then is conveyed to between the document holder 23 and the conveyance reading surface 112. Thereafter, the document passes by an opening 23B adjacent to the document holder 23 and then is conveyed to the sheet discharge portion 24. Thus, in the image reading portion 1, light can be radiated from the reading unit 12 through the conveyance reading surface 112 to a document conveyed by the ADF 2, whereby image data can be read from the document.

In addition, as shown in FIG. 2, the ADF 2 is supported in an openable and closable manner with respect to the document placement surface 111 and the conveyance reading surface 112 of the document table 11, and also serves as a cover member for the document table 11. On the lower surface of the ADF 2, a color reference surface 25 opposing to the document placement surface 111 of the document table 11, and a color reference surface 26 opposing to the conveyance reading surface 112 of the document table 11, are provided.

The color reference surface 25 is a white surface used for, when image data is read by the image reading portion 1 from a document placed on the document placement surface 111, determining the boundary of the document, for example. The color reference surface 26 is the lower surface of the document holder 23, and is a white surface used for, when image data is read by the image reading portion 1 from a document conveyed to the conveyance reading surface 112, determining the boundary of the document, for example. In addition, the control portion 5 executes various types of image processing such as shading correction and gamma correction, based on white image data read from the color reference surface 25, for example.

On the color reference surface 26, a predetermined black partial region 27 is provided whose color is different from a white color of the base color of the color reference surface 26. The shape of the partial region 27 is a rectangular shape as shown in FIG. 2, for example. It is noted that the shape of the partial region 27 may be a circle or a line, for example. In addition, the partial region 27 is not limited to a black color having a high density, but may be a colored region having a predetermined density such as gray that is different from the base color of the color reference surface 26. Specifically, the partial region 27 may have such a predetermined color that, on image data read from the color reference surface 26, a density difference between the base color of the color reference surface 26 and the color of the partial region 27 varies depending on the degree in which the ADF 2 is opened or closed.

In addition, the partial region 27 is located at a position corresponding to inside of the range of the minimum size of a document that can be conveyed by the ADF 2. Specifically, in the case where the ADF 2 is configured to convey a document in a centered manner, as shown in FIG. 2, the partial region 27 is located at a position corresponding to a center portion in a sheet width direction of the document conveyed by the ADF 2. Thus, when image data is read from a document by using the ADF 2, the partial region 27 is hidden by the document, so that the partial region 27 is not read as image data of the document. It is noted that in the case where the ADF 2 is configured to convey a document in a top-aligned manner or a bottom-aligned manner, the partial region 27 is located at a position corresponding to the upper end or the lower end in a sheet width direction of the document conveyed by the ADF 2.

In the multifunction peripheral 10, since the partial region 27 is provided on the color reference surface 26, a white surface used for reading white reference data is provided on the back surface of the document table 11, in a region between the document placement surface 111 and the conveyance reading surface 112. Thus, when image data is read by the image reading portion 1 from a document conveyed to the conveyance reading surface 112, the control portion 5 can execute various types of image processing such as shading correction and gamma correction based on white image data read from the white surface. As a matter of course, on the color reference surface 26, the partial region 27 may be located at a position that is outside the range of the maximum size of a document that can be conveyed by the ADF 2 and allows reading by the image reading portion 1. In this case, the control portion 5 can execute various types of image processing such as shading correction and gamma correction based on white image data read from the color reference surface 26, for example.

Figure 3:
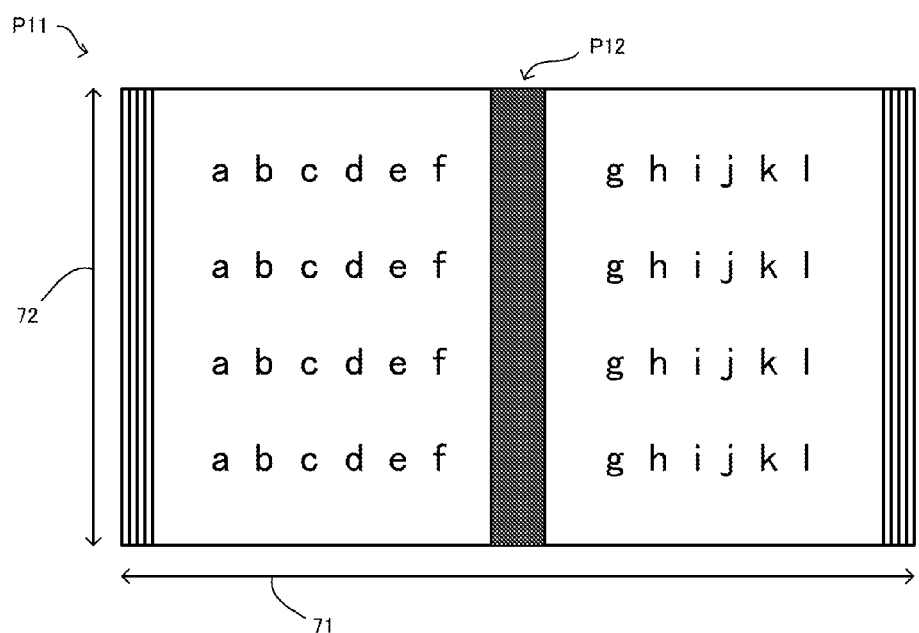
FIG. 3 is a diagram showing an example of image data read from a book document by the multifunction peripheral according to the embodiment of the present disclosure.

Here, in the multifunction peripheral 10, as shown in FIG. 2, when image data is read from a book document P1 which is thick, such as a book formed by a plurality of sheets bound at the center, a center portion P2 of the book document P1 placed on the document placement surface 111 lifts up. In this case, as shown in FIG. 3, on image data P11 read from the book document P1 by the image reading portion 1, a black belt-like image appears in a region P12 corresponding to the center portion P2 of the book document P1. Therefore, it is conceivable that a special sensor is newly provided for determining whether or not a document placed on the document table 11 is a book document. On the other hand, in the multifunction peripheral 10, the control portion 5 executes image reading processing (see FIG. 4) described later and thereby determines whether or not a document placed on the document placement surface 111 is a book document. Thus, whether or not a document placed on the document table 11 is a book document can be determined without using a special sensor. Then, if the control portion 5 has determined that the document is a book document, the control portion 5 removes a black belt-like image from the image data read from the book document.

<Image Reading Processing>

Figure 4:
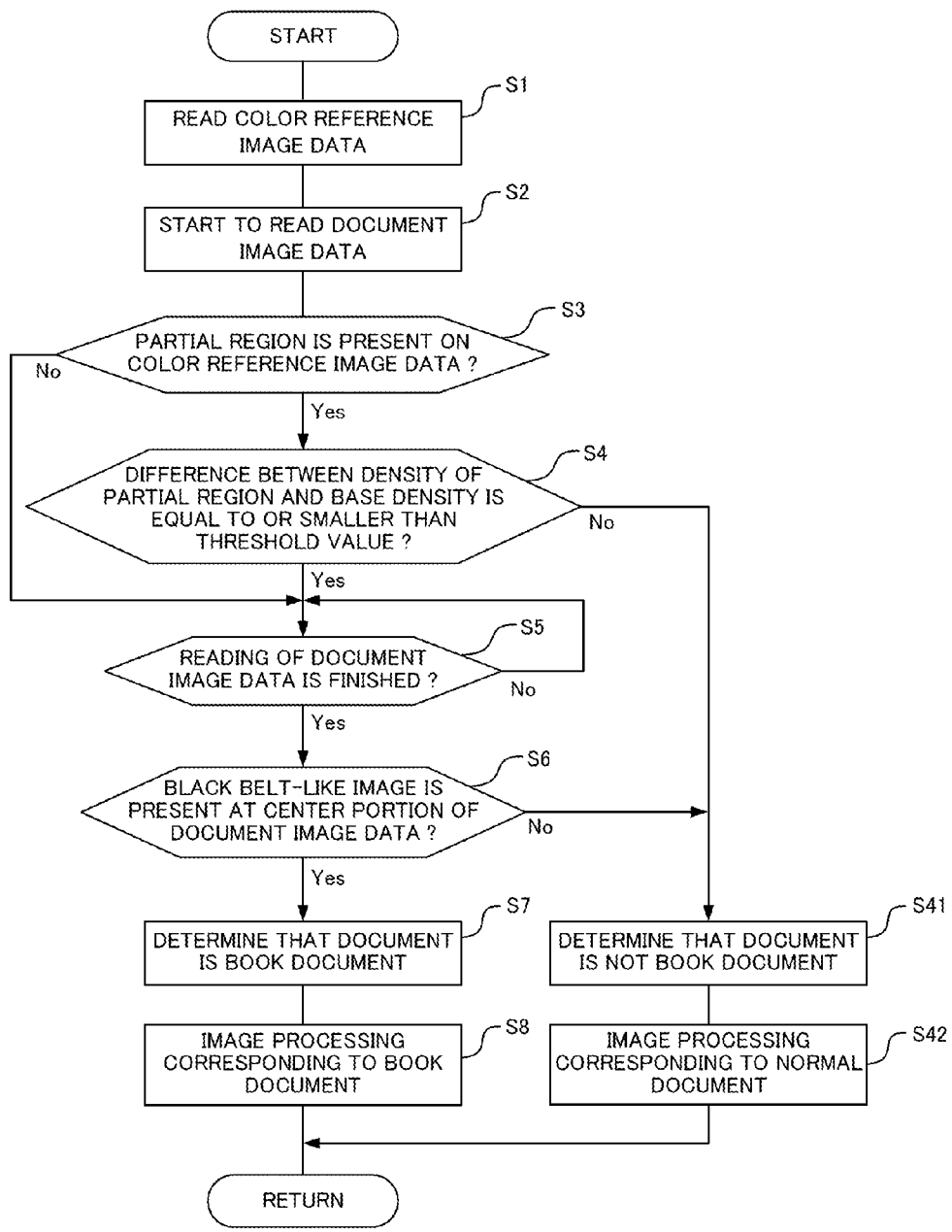
FIG. 4 is a flowchart for explaining an example of the procedure of image reading processing executed by the multifunction peripheral according to the embodiment of the present disclosure.

Hereinafter, with reference to FIG. 4, an example of the procedure of image reading processing executed by the control portion 5 will be described. Here, steps S1, S2, . . . denote identification numbers of the processing procedure (steps) executed by the control portion 5.

In the state where a document is placed on the document placement surface 111, when an image reading start operation to the operation display portion 6 is performed or when an image reading start request is received from an information processing apparatus such as a personal computer, the image reading processing is executed by the control portion 5. It is noted that image reading processing using the ADF 2 is the same as the conventional one, so the description thereof is omitted.

[Step S1]

First, in step S1, the control portion 5 executes image reading processing of reading image data from the color reference surface 26 opposing to the conveyance reading surface 112 by the image reading portion 1. Here, the step S1 corresponds to a reading control step, and the control portion 5 as executing the step S1 is an example of a reading control portion.

Specifically, the control portion 5 moves the reading unit 12 so that the reading position of the image reading portion 1 will be positioned at the conveyance reading surface 112, and causes the reading unit 12 to radiate light to the color reference surface 26, thereby reading image data from the color reference surface 26. At this time, the image reading portion 1 reads image data corresponding to one line along the primary scanning direction 72 from the color reference surface 26, for example. Hereinafter, image data read from the color reference surface 26 is referred to as color reference image data. It is noted that in the case where the standby position (home position) of the reading unit 12 is a position that allows image data of a document to be read through the conveyance reading surface 112, the control portion 5 does not need to move the reading unit 12.

[Step S2]

After the image reading processing in step S1 is finished, in subsequent step S2, the control portion 5 starts image reading processing of reading image data from a document placed on the document placement surface 111 by the image reading portion 1.

Specifically, the control portion 5 moves the reading unit 12 so that the reading position of the image reading portion 1 will be positioned at the reading start position of the document placement surface 111. Then, the control portion 5 radiates light from the reading unit 12 to a document placed on the document placement surface 111 while moving the reading unit 12 in the secondary scanning direction 71, thereby reading image data from the document. Hereinafter, the image data read from the document is referred to as document image data.

[Step S3]

Next, in step S3, the control portion 5 determines whether or not the partial region 27 is present in the color reference image data read in step S1. Specifically, in the state where the ADF 2 is opened, light radiated from the reading unit 12 is not reflected by the color reference surface 26, and therefore the color reference image data becomes a substantially uniform black image, so that the density difference between the maximum density and the minimum density is reduced. Accordingly, if the density difference between the maximum density and the minimum density on the color reference image data is equal to or greater than a predetermined lower limit value, the control portion 5 determines that the partial region 27 is present.

In step S3, if the control portion 5 has determined that the partial region 27 is present (Yes in S3), the control portion 5 shifts the process to step S4. On the other hand, in step S3, if the control portion 5 has determined that the partial region 27 is not present (No in S3), the control portion 5 determines that the ADF 2 is opened, and shifts the process to step S5.

[Step S4]

In step S4, the control portion 5 determines whether or not the density difference between the density of the partial region 27 and the density of the color reference surface 26 on the color reference image data read in step S1 is equal to or smaller than a predetermined threshold value.

For example, the control portion 5 calculates the density difference between the maximum density and the minimum density on the color reference image data, as the density difference between the density of the partial region 27 and the density of the color reference surface 26. It is noted that the position of the partial region 27 on the color reference surface 26 is known in accordance with the sheet size of a document. Therefore, in another embodiment, the control portion 5 may calculate the density difference between the average value on image data corresponding to the partial region 27 and the average value on image data corresponding to the other region.

Here, the threshold value is a value set in advance as an index for determining the open degree of the ADF 2. For example, the threshold value is a value obtained by an experiment or simulation as the density difference between the density of the partial region 27 and the density of the color reference surface 26 caused when the color reference image data is read in the state where the open degree of the ADF 2 is 20 degrees. Thus, in step S4, whether or not a book document that causes the ADF 2 to be opened by 20 degrees or more is placed on the document placement surface 111, can be determined. It is noted that the open degree of the ADF 2 for determining whether or not a document is a book document may be freely set in advance at 10 degrees, 30 degrees, or the like.

In step S4, if the control portion 5 has determined that the density difference is equal to or smaller than the threshold value (Yes in S4), the control portion 5 shifts the process to step S5. On the other hand, in step S4, if the control portion 5 has determined that the density difference is greater than the threshold value (No in S4), the control portion 5 shifts the process to step S41.

Figure 5A:
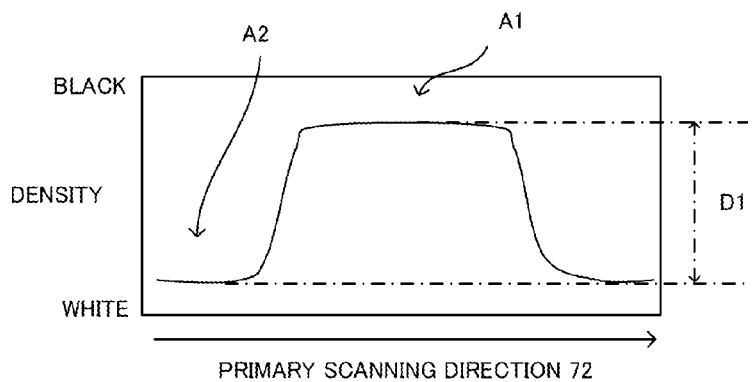
FIGS. 5A to 5C are diagrams showing examples of a result of reading the density of a partial region in the multifunction peripheral according to the embodiment of the present disclosure.
Figure 5B:
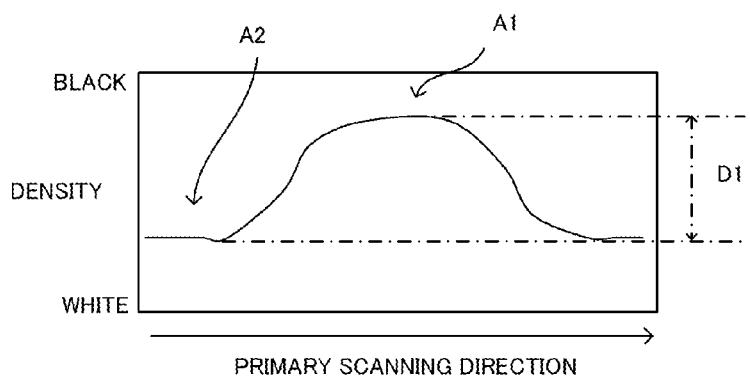
Figure 5C:
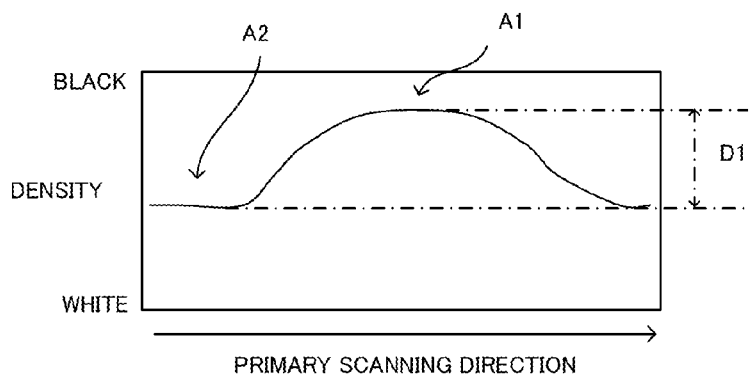

Here, FIGS. 5A to 5C are diagrams each showing a part of the color reference image data read in step S1. FIG. 5A is an example of the color reference image data read in the state where the ADF 2 is closed, FIG. 5B is an example of the color reference image data read in the state where the ADF 2 is slightly opened, and FIG. 5C is an example of the color reference image data read in the state where the ADF 2 is largely opened.

As shown in FIG. 5A, in the state where the ADF 2 is closed, a density difference D1 occurring between a region A1 corresponding to the partial region 27 on the color reference image data and a region A2 corresponding to the base of the color reference surface 26, is great. On the other hand, if the ADF 2 is slightly opened, the density difference D1 is reduced as shown in FIG. 5B, and further, if the ADF 2 is largely opened, the density difference D1 is further reduced as shown in FIG. 5C. Therefore, the control portion 5 determines the open degree of the ADF 2 by determining whether or not the value of the density difference D1 is equal to or smaller than the threshold value as described above, and thus the control portion 5 can determine whether or not the document placed on the document placement surface 111 is a thick book document.

[Steps S41 to S42]

If the density difference is greater than the threshold value, in subsequent step S41, the control portion 5 determines that the document placed on the document placement surface 111 is not a book document. Then, in step S42, the control portion 5 executes conventionally-known image processing corresponding to a normal document that is not a book document. It is noted that the image processing is, for example, shading correction, gamma correction, and the like performed for the document image data.

[Step S5]

On the other hand, if the density difference is equal to or smaller than the threshold value, in subsequent step S5, the control portion 5 causes the process to wait until the image reading processing for the document image data started in step S2 is finished (No in S5). Then, after the image reading processing is finished (Yes in S5), the control portion 5 shifts the process to step S6.

[Step S6]

In step S6, based on the document image data, the control portion 5 determines whether or not a predetermined black belt-like image is present at a center portion on the document image data. Specifically, the control portion 5 averages the document image data for every line along the primary scanning direction 72. It is noted that the control portion 5 can determine the position of the center portion from the sheet length of the document detected by the size detection portion 17. Therefore, a target to be averaged on the document image data may be only a region of the center portion in the secondary scanning direction 71 on the document image data. In this case, when the region of the center portion on the document image data is read, the control portion 5 may execute the processing in step S6 in parallel with the image reading processing.

Figure 6A:
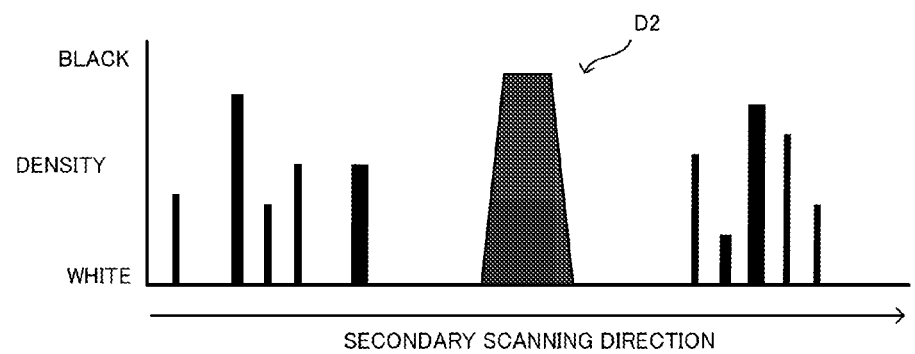
FIGS. 6A and 6B are diagrams showing examples of a result of execution of the image reading processing in the multifunction peripheral according to the embodiment of the present disclosure.

Here, FIG. 6A is a diagram showing an example of the averaged data obtained by averaging, for every line along the primary scanning direction 72, the document image data read from the book document placed on the document placement surface 111. As shown in FIG. 6A, the averaged data includes a region D2 corresponding to a black belt-like image occurring at a center portion of the book document, in which high-density lines are continuously present in the secondary scanning direction 71.

Accordingly, for example, if a predetermined number or more of predetermined high-density lines are continuously present on the averaged data, the control portion 5 can determine that a black belt-like image is present. Also, if a predetermined number or more of predetermined high-density lines are present within a predetermined region on the averaged data, the control portion 5 can determine that a black belt-like image is present.

Then, in step S6, if the control portion 5 has determined that a black belt-like image is present on the document image data (Yes in S6), the control portion 5 shifts the process to step S7. On the other hand, in step S6, if the control portion 5 has determined that a black belt-like image is not present on the document image data (No in S6), the control portion 5 shifts the process to step S41.

[Step S7]

In step S7, the control portion 5 determines that the document placed on the document placement surface 111 is a book document. That is, in the image reading processing, if the density difference is equal to or smaller than the threshold value and a black belt-like image is present on the document image data, the control portion 5 determines that the document placed on the document placement surface 111 is a book document. Here, such processing corresponds to a document determination step, and the control portion 5 as executing such processing is an example of a document determination portion.

[Step S8]

Figure 6B:
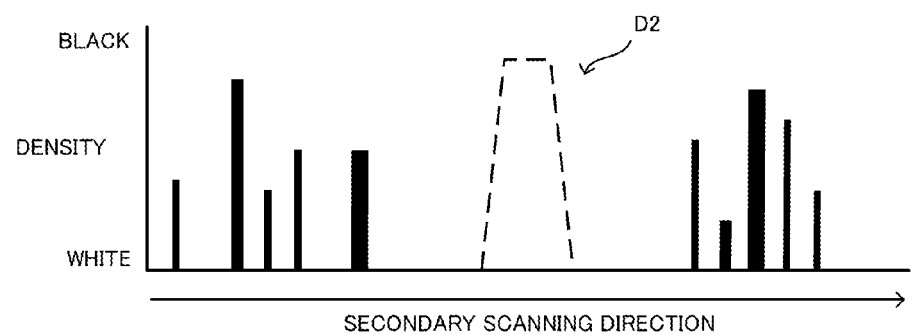

Then, in step S8, the control portion 5 executes predetermined image processing corresponding to a book document. Specifically, in the image processing, the control portion 5 executes replacement processing of replacing image data of the black belt-like image included in the document image data, with image data having a predetermined density corresponding to white. Thus, on the document image data read from the book document, the black belt-like image is removed (see FIG. 6B). Here, the control portion 5 as executing the replacement processing is an example of a density replacement portion.

It is noted that the image processing in step S8 is not limited to replacement of image data of the center portion of the document image data with white density image data. For example, a predetermined density value may be subtracted from the image data of the center portion. If the whole black belt-like image is removed, the boundary between spread pages of the book document becomes obscure. Therefore, when the control portion 5 removes the black belt-like image, the control portion 5 may leave a borderline at the center position of the sheet length detected by the size detection portion 17.

As described above, in the multifunction peripheral 10, whether or not a document placed on the document placement surface 111 is a book document is determined by the control portion 5 based on image data read by the image reading portion 1, without using a special sensor. Then, in the multifunction peripheral 10, when the document placed on the document placement surface 111 is a book document, the document image data in which a black belt-like image has been removed can be obtained.

In addition, in the multifunction peripheral 10, the density difference between the density of the color reference portion 26 and the density of the partial region 27 is used as a determination index for whether or not the document is a book document. Therefore, even in a use environment in which there is an influence of disturbance light such as sunlight or indoor illumination, it is possible to determine the open degree of the ADF 2, excluding the influence of disturbance light.

In the above embodiment, the configuration has been described in which, if the control portion 5 has determined that the density difference is equal to or smaller than the threshold value in step S4 and has determined that a black belt-like image is present on the document image data in step S6, the control portion 5 determines that the document is a book document. Instead, in another embodiment, the processing in step S6 may be omitted, and if the control portion 5 has determined that the density difference is equal to or smaller than the threshold value in step S4, the control portion 5 may determine that the document is a book document. Such processing is also an example of the document determination step, and the control portion 5 as executing such processing is an example of the document determination portion.

In the above embodiment, the case where the partial region 27 is provided on the color reference surface 26 opposing to the conveyance reading surface 112, has been described as an example. Instead, in another embodiment, the partial region 27 may be provided on the color reference surface 25 opposing to the document placement surface 111. In this case, the partial region 27 is provided at a position that allows reading by the image reading portion 1 and is outside the range of the predetermined maximum size of a document that allows reading by using the document placement surface 111. In addition, in this case, the multifunction peripheral 10 may have, instead of the ADF 2, a cover member that is openable and closable with respect to the document placement surface 111, and the color reference surface 25 and the partial region 27 may be provided on the cover member.

It is to be understood that the embodiments herein are illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

The invention claimed is:

1. An image reading apparatus comprising:
 a document table having a document placement surface which allows a document to be placed thereon;
 an image reading portion configured to, based on light reflected when light is radiated through the document placement surface to a document placed on the document placement surface, read image data from the document;
 a cover member configured to be openable and closable with respect to the document table, and having a color reference surface opposing to the document table and a partial region provided on the color reference surface, the partial region having a predetermined density different from a density of the color reference surface;
 a reading control portion configured to read image data from the color reference surface and the partial region of the cover member by the image reading portion; and
 a document determination portion configured to, when a density difference between a density of the color reference surface and a density of the partial region on the image data read by the reading control portion is equal to or smaller than a predetermined threshold value, determine that the document placed on the document placement surface is a book document.

2. The image reading apparatus according to claim 1, wherein when the density difference is equal to or smaller than the threshold value and a predetermined belt-like image is present on the image data read from the document by the image reading portion, the document determination portion determines that the document placed on the document placement surface is a book document.

3. The image reading apparatus according to claim 2, wherein when a predetermined number or more of predetermined high-density lines are continuously present on averaged data obtained by averaging the image data for every line, or when a predetermined number or more of predetermined high-density lines are present within a predetermined region on the averaged data, the document determination portion determines that the belt-like image is present on the image data.

4. The image reading apparatus according to claim 1, comprising a density replacement portion configured to, when the document determination portion has determined that the document is a book document, replace a density of the belt-like image on the image data with a predetermined density.

5. The image reading apparatus according to claim 1, comprising a document conveying portion configured to convey a document through a reading position where image data is read by the image reading portion, wherein
 the document table has a conveyance reading surface which allows transmission of light radiated from the image reading portion to the document conveyed by the document conveying portion, and
 the color reference surface and the partial region are provided at a position opposing to the conveyance reading surface.

6. The image reading apparatus according to claim 5, wherein the partial region is provided at a position corresponding to inside of the range of the minimum size of a document that can be conveyed by the document conveying portion.

7. The image reading apparatus according to claim 5, wherein the document conveying portion also serves as the cover member.

8. An image forming apparatus comprising: an image reading apparatus configured to read an image; and an image forming portion configured to form an image, wherein the image reading apparatus including:
 a document table having a document placement surface which allows a document to be placed thereon;
 an image reading portion configured to, based on light reflected when light is radiated through the document placement surface to a document placed on the document placement surface, read image data from the document;
 a cover member configured to be openable and closable with respect to the document table, and having a color reference surface opposing to the document table and a partial region provided on the color reference surface, the partial region having a predetermined density different from a density of the color reference surface;
 a reading control portion configured to read image data from the color reference surface and the partial region of the cover member by the image reading portion; and a document determination portion configured to, when a density difference between a density of the color reference surface and a density of the partial region on the image data read by the reading control portion is equal to or smaller than a predetermined threshold value, determine that the document placed on the document placement surface is a book document.

9. The image forming apparatus according to claim 8, wherein when the density difference is equal to or smaller than the threshold value and a predetermined belt-like image is present on the image data read from the document by the image reading portion, the document determination portion determines that the document placed on the document placement surface is a book document.

10. The image forming apparatus according to claim 9, wherein when a predetermined number or more of predetermined high-density lines are continuously present on averaged data obtained by averaging the image data for every line, or when a predetermined number or more of predetermined high-density lines are present within a predetermined region on the averaged data, the document determination portion determines that the belt-like image is present on the image data.

11. The image forming apparatus according to claim 8, comprising a density replacement portion configured to, when the document determination portion has determined that the document is a book document, replace a density of the belt-like image on the image data with a predetermined density.

12. The image forming apparatus according to claim 8, comprising a document conveying portion configured to convey a document through a reading position where image data is read by the image reading portion, wherein
the document table has a conveyance reading surface which allows transmission of light radiated from the image reading portion to the document conveyed by the document conveying portion, and
the color reference surface and the partial region are provided at a position opposing to the conveyance reading surface.

13. The image forming apparatus according to claim 12, wherein the partial region is provided at a position corresponding to inside of the range of the minimum size of a document that can be conveyed by the document conveying portion.

14. The image forming apparatus according to claim 12, wherein the document conveying portion also serves as the cover member.

15. An image reading method to be executed in an image reading apparatus including: a document table having a document placement surface which allows a document to be placed thereon; an image reading portion configured to, based on light reflected when light is radiated through the document placement surface to a document placed on the document placement surface, read image data from the document; and a cover member configured to be openable and closable with respect to the document table, and having a color reference surface opposing to the document table and a partial region provided on the color reference surface, the partial region having a predetermined density different from a density of the color reference surface, the image reading method comprising:
a reading control step of reading image data from the color reference surface and the partial region of the cover member by the image reading portion; and
a document determination step of, when a density difference between a density of the color reference surface and a density of the partial region on the image data read in the reading control step is equal to or smaller than a predetermined threshold value, determining that the document placed on the document placement surface is a book document.

16. The image reading method according to claim 15, wherein when the density difference is equal to or smaller than the threshold value and a predetermined belt-like image is present on the image data read from the document in the reading control step, the document determination step determines that the document placed on the document placement surface is a book document.

17. The image reading method according to claim 16, wherein when a predetermined number or more of predetermined high-density lines are continuously present on averaged data obtained by averaging the image data for every line, or when a predetermined number or more of predetermined high-density lines are present within a predetermined region on the averaged data, the document determination step determines that the belt-like image is present on the image data.

18. The image reading method according to claim 15, wherein when the document determination step has determined that the document is a book document, a density of the belt-like image on the image data is replaced with a predetermined density.

* * * * *